Dec. 17, 1963  J. W. MILLIGAN  3,114,582
MAGNETIC SUSPENSION
Filed Oct. 16, 1958

SOURCE OF
FLASH CURRENT

SOURCE OF
FLASH
CURRENT

INVENTOR.
James W. Milligan
BY
Jones, Darbo & Robertson
Attys.

United States Patent Office 3,114,582
Patented Dec. 17, 1963

3,114,582
MAGNETIC SUSPENSION
James W. Milligan, West Lafayette, Ind., assignor to Duncan Electric Company, Inc., Lafayette, Ind., a corporation of Indiana
Filed Oct. 16, 1958, Ser. No. 767,560
3 Claims. (Cl. 308—10)

There have been many proposals for suspending rotating parts magnetically so that the weight of the rotating parts does not cause any friction. The disk and shaft comprising the rotating element of watthour meters has been successfully suspended magnetically for some years. The copending application Serial No. 359,989, filed June 8, 1953, Patent 2,869,934, supplemented by Patent 2,869,935, in both of which the present patentee was joined by Stanley S. Green, taught principles which can be used to produce greater stiffness than has been found in commercial magnetic suspensions heretofore.

Stiffness in a magnetic suspension as in a spring refers to the ability to yield only slightly when an added downward force may be applied to the suspended element. It should be understood that magnetic suspensions are in a state of equilibrium in which the upward magnetic pull exactly equals the downward pull of gravity on the suspended element. Should, for example, ten percent more weight be added to the rotating or suspended element, it must inevitably move downwardly until the increased upward magnetic forces again equal the increased weight. Stiffness in a magnetic suspension is the ability to gain this needed additional upward magnetic pull by a very minute downward movement of the suspended element.

Although the present invention utilizes principles of the prior application, it applies these principles to an improved structure which makes better use of the principles and is at the same time more economically to manufacture, more certain to have no appreciable magnetic locking characteristics which inhibit rotation of the rotating magnetically suspended element if only slight rotating forces are applied to it. In the form at present preferred, two pairs of poles are provided from only two magnets and the magnets are of a shape easily molded. All four of the poles providing the two pairs are sharply demarked dimensionally in the direction necessary to give maximum intensification of the stiffness characteristics. No additional parts are required for the magnetic circuit. Permanent magnets are thoroughly shielded by a very inexpensive construction.

A method of magnetization is provided which largely confines the magnetizing flux to flux passing generally perpendicularly through the pole faces, thereby aiding in achieving maximum stiffness.

DESIGNATION OF FIGURES

GENERAL DESCRIPTION

Figure 1:
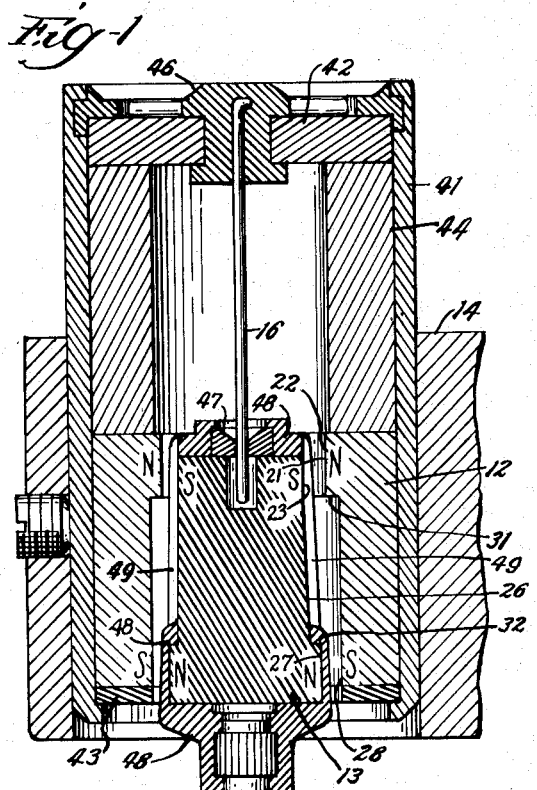
FIGURE 1 is a vertical sectional view of a preferred form of the present invention chosen for illustration, applied to a spindle such as that of a watthour meter, intervening parts being omitted.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

The invention has been illustrated as it might be found in a watthour meter for magnetically supporting the spindle or shaft 11 thereof by which the rotary disk is carried. The entire weight of the rotary element is supported magnetically by attraction between magnet 12 and a rotor magnet 13. The stator magnet 12 is carried by a bracket 14 of the meter frame, and the rotor magnet 13 is mounted on the upper end of spindle 11. A guide pin 16 tends to hold the rotor magnet 13 accurately centered within the stator magnet 12. Likewise, at the lower end of the shaft a guide pin 17, running in a bushing 18 which may be of graphite, tends to hold the lower end of the shaft accurately centered on its intended axis. Normally neither pin 16 nor 17 affects the vertical positioning of the shaft 11. The meter disk is preferably located relatively close to the lower bearing so that side thrusts exerted inductively on it have relatively little influence on the magnetic suspension, which is used as an upper bearing. The meter is preferably designed to minimize such side thrusts.

MAGNET DATA AND PRINCIPLES

The stator magnet 12 preferably has a hollow cylindrical body formed with an integral inwardly extending magnetic pole 21 terminating with an annular pole face 22 which faces inwardly (toward the axis and toward the rotary magnet 13). The rotor magnet 13 has a corresponding annular pole face 23 facing outwardly. In the form illustrated in FIG. 1, no dimensional demarcation distinguishes the pole face 23 from the body of the magnet 13.

The rotary magnet 13 is shaped with an enlarged annular pole portion 26 terminating in an annular pole face 27 which faces outwardly (away from the axis and toward the stator magnet 12). The lower portion of the stator magnet 12 forms an inwardly facing annular face 28. It also is shown in FIG. 1 without dimensional demarcation distinguishing it from the body of stator magnet 12.

The magnets 12 and 13 are permanent magnets magnetized oppositely so that pole face 22 attracts pole face 23, and pole face 28 attracts pole face 27. When the pole faces 23 and 27 are in the position shown in FIG. 1, displaced slightly downwardly from pole faces 22 and 28, the magnetic attraction applies an upward or lifting force to the rotary element. If the rotor magnet 13 were moved upwardly to a neutral position the upward force would be reduced to zero. As the rotor magnet 13 moves downwardly by gravity, the upward force increases until it equals the weight of the rotary element, at which time the downward movement of the rotary element ceases, and a condition of vertical stability is reached.

VERTICAL STIFFNESS WITH LOW SIDE THRUST

For various reasons, it is important to achieve a characteristic which may be called "stiffness" or "vertical stiffness." The meaning is similar to stiffness in a spring. Once the rotary element has reached its position of stability there will be only very minute rising or falling from this position as minor forces tend to lift or lower the rotary element. In other words, it is desired that the rotary element have a low ratio of vertical movement to applied vertical force.

As pointed out in the prior application mentioned, one factor which can contribute importantly toward the desired vertical stiffness is the use of annular poles which face as the poles here shown face, and which are abruptly defined in the direction of relative displacement of the other face. Thus the pole face 22 is abruptly terminated by the shoulder 31 forming the bottom edge of face 22. Likewise, the face 23 is abruptly terminated by the upper face of magnet 13 which forms the upper edge of face 23. In similar manner pole face 27 is abruptly terminated by shoulder 32, and pole face 28 is abruptly terminated by the lower face of magnet 12.

The provision of sharp dimensional definition of each pole face in the direction of relative displacement of the opposite face from it contributes toward vertical stiffness of the magnetic suspension because it inhibits creepage or shifting of the flux from the pole face to an adjacent surface. There tends to be no place for the flux to go (readily) except from pole face to opposite pole face.

Although the illustrated magnet suspension in the prior application mentioned provided only one pair of inwardly and outwardly facing poles, the present preferred form of the invention provides two such pairs, each with proper abrupt dimensional demarcations. Accordingly, great vertical stiffness can be achieved.

Another desirable characteristic of magnetic suspensions is low side thrust. As the rotor, in the type of suspensions here illustrated, is displaced from its true central position, magnetic side thrust appears, and increases as the displacement increases. This side thrust creates friction on the pin 16, and is objectionable. It is therefore desirable to keep the side thrust, or the ratio of side thrust to eccentric displacement, low. The side thrust ratio can be reduced by increasing the gap length, namely, the spacing from one pole face to the opposed pole face, or by decreasing the flux density in the gap. But those changes also reduce the vertical stiffness. However, the sharp dimensional demarcation of the pole faces already referred to which increases the vertical stiffness, and other factors which increase the vertical stiffness, tend to make a greater gap length or lower density tolerable as to stiffness, and these in turn reduce the side thrust. Accordingly, although the two pairs of poles illustrated both have some side thrust, and any side thrust is inherently undesirable, their characteristics of high vertical stiffness permit a design which keeps the side thrust within tolerable limits.

MAGNETIC MATERIAL

Vertical stiffness is increased and side thrust reduced by using magnetic materials of very high coercive force at the pole faces, preferably in a state having very low incremental permeability. This is one of the important subjects covered by the previous application. The present invention provides such material at all pole faces at very low cost and with a high degree of magnetic uniformity. Magnetic uniformity is desirable, to prevent magnetic locking. If each of the opposing pole faces was peripherally non-uniform so that each had a magnetically strong zone, these two magnetically strong zones would tend to attract one another and resist the turning of the rotor which would separate them. According to the present invention magnetic uniformity, pole faces with proper sharp dimensional demarcation, and economy of construction are all achieved by using powder-molded magnets. The magnetic material at present preferred is powdered Alnico XII. The composition of this material in parts by weight is:

*Alnico XII*

| | |
|---|---|
| Cobalt | 35 |
| Nickel | 18 |
| Aluminum | 6 |
| Titanium | 8 |
| Iron | 33 |

This powder molding of magnets is a known art. It can be performed, for example, in accordance with Mendelsohn Patent 2,724,174. According to the present preferred form of the invention however, an epoxy resin is used as a binding material, and one is chosen which has a high distortion temperature and which in curing goes through a liquid or near liquid phase which permits close dimensional production.

MAGNETIC STABILITY

It is important that magnetic suspensions be characterized by high magnetic stability. Of course this partly means choosing the right permanent magnet material and stabilizing with proper knockdown and other known treatments. Alnico XII is one such material. However, no material is completely immune to further permanent change from external influences, and careful shielding from external or stray magnetic fields is important. It the illustrated form of the invention, the shielding has been found to be exceptionally good and includes both conductive metal shielding and soft iron shielding. It is provided at very low cost, some of the parts being provided for structural reasons anyway, and other parts being simple and of very low cost.

Soft iron shielding consists of the shell 41 and a cap 42. Both may be formed of cold rolled steel and preferably the cap has a snug fit within the shell. They not only serve to shield the permanent magnets by diverting around them flux which would otherwise pass through them, but they also support the guide pin 16 in true centered relationship with respect to the magnet 12. Because the pole faces of stator magnet 12 are at the inner face of the magnet, the shell 41 can snugly engage the periphery with beneficial slimness and without excessive magnetic loss. In fact, with the magnetization described below, the shell 41 actually improves the lift, carrying some useful flux. The mid-portion of magnet 12 is largely bypassed.

The electroconductive shielding includes an aluminum washer 43 and an aluminum bushing 44 at opposite ends of the stator magnet 12. Also, the diecast metal to be described furnishes some electroconductive shielding.

The stator parts may be all held together economically by diecast metal. The die forms a jig which exactly positions the pin 16 with respect to the magnet 12.

Likewise the rotor magnet 13 may be held in proper place on spindle 11 and bearing bushing 47 held in proper place on magnet 13 by assembling these parts in a die in which is cast diecast metal 48. All of the parts marked 48 adjacent rotor magnet 13 in FIG. 1 are integral portions of the same diecasting as are ribs 49. There are six ribs 49 evenly spaced, which not only hold the other parts of the diecasting together but also serve as non-magnetic spacers for preventing contact of any of the pole faces with one another. This is desirable during insertion of rotor magnet 13 within stator magnet 12 because the upper end of magnet 13 has the same polarity as the lower end of magnet 12 and bringing their pole faces into contact could cause a slight localized "knockdown" with resulting non-uniformity peripherally. Even after insertion or in fully assembled condition, contact between the pole faces should be avoided since the attraction would be so great that the parts might not free themselves to resume their normally concentric position.

MAGNETIZATION

Figure 2:
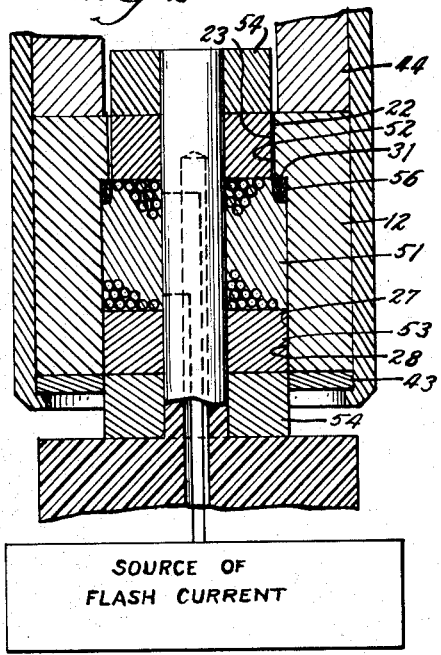
FIGURE 2 is a sectional view showing magnetization of the stator of FIG. 1.

As described but not claimed in the prior application mentioned, it is desirable that the magnets 12 and 13 be magnetized by flux which extends perpendicularly to the pole faces while flux is largely excluded from adjacent surface faces. With the forms of magnet illustrated in FIG. 1, this can be accomplished according to principles illustrated in FIGS. 2 and 3. Thus in FIG. 2 there is a magnetizing coil 51 having at its opposite ends annular magnetically soft, preferably laminated steel poles 52 and 53. These have a snug fit with pole faces 22 and 28 so as to concentrate the magnetizing flux perpendicularly through them. Heavy electroconductive washers 54 beyond the poles in both directions from the coil, and washers 43 and 44 resist a quick surge of magnetism through them to the end faces of magnet 12. Similarly, electroconductor 56 just inside the pole 52 can resist a surge of magnetism through the face of shoulder 31. Conductor 56 may be a ring or formed of overlapping split rings or short lengths. Thus substantially all of the magnetizing flux in the vicinity of pole face 22 is generally perpendicular to and passes through that face.

The electroconductive rings are effective only for very brief shots of magnetizing flux. Accordingly the coil 51 should be energized by a brief flash of current, and a source for such current has been indicated on the drawings. Magnets have been magnetized before with impulse current sources, but not (so far as known) to cooperate with electroconductive shields to confine the resulting magnetism to the intended pole face, nor with the very brief impulses or flashes here preferred. The electroconductive rings could be replaced by properly wound conductors connected to a source of current, with the same effect; that being the form of the present invention illustrated in the prior application mentioned, the disclosure of which is hereby incorporated herein by reference.

Figure 3:
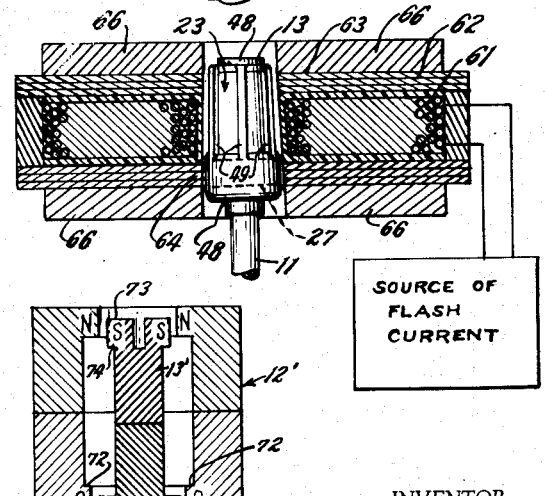
FIGURE 3 is a sectional view showing magnetization of the rotor magnet of FIG. 1.

In FIG. 3 a magnetizer of similar principles is provided for rotor magnet 13. This is a doughnut-shaped device energized by a coil 61. A shell 62 of soft magnetic material is built around the coil 61 forming annular poles 63 and 64, preferably laminated, snugly fitting the diecast metal 48 and ribs 49 to be as close as possible to pole faces 23 and 27, respectively. Electroconductors 66 may substantially exclude flux from entering the end faces of magnet 13. Diecast metal 48 adjacent shoulder 32 may to some extent similarly protect shoulder 32. The source of current again is of the flash type. A copper ring can be added to the magnetizing fixture just above the face of pole 64, to additionally help keep flux from the face of shoulder 32.

*Poles Defined on Both Sides*

Figure 4:
FIGURE 4 is a sectional view of a modified form of the suspension magnets.

FIG. 4 illustrates a construction of stator magnet 12' and of rotor magnet 13' which provides annular pole faces dimensionally defined along both edges. Thus stator 12' has an inwardly extending lower pole 71 defined by shoulder 72, and rotor magnet 13' has an outwardly enlarged upper pole 73 defined by shoulder 74. To facilitate powder molding, each of these magnets may be made in two pieces as indicated.

*Molding Data*

Although powder molding is a known art, some details as to the presently contemplated form of molding may be helpful. Alnico particles are preferably a mixture of sizes from that indicated by 70 mesh to 120 mesh. About six percent of their weight of epoxy resin should be evenly distributed with the Alnico in the mold, as by pre-coating the Alnico particles uniformly. The mixture is cold-pressed in the mold and retains the mold shape when removed. It is then cured by polymerization in an oven. A slight draft or tapering, preferably not along the pole faces, may be provided for facilitating the mold removal.

ADDITIONAL DATA

It will be observed that the ring bearing 47, which may be of graphite, rests on a flat upper surface of rotor magnet 13. It is accurately centered with respect to the rotor magnet 13 by the die prior to the injection of the diecast metal 48 into the die and around the ring bearing 47 so as to hold it permanently and accurately in centered position. It will be understood, that the die is formed with a pin fitting snugly into the hole of the ring bearing 47 as well as with parts which snugly engage the pole 23 (except where the ribs are to be formed). Likewise, the die will engage the shaft 11, and the magnet 13 at or near the pole face 27. In the illustrated form the pole face 27 is entirely covered with diecast metal and therefore the engagement of the die would be above the pole face 27. The die preferably fits the magnet extremely closely. An advantage of the plastic-bonded magnet is its slight resilience which lets the die be designed with less tolerance than would otherwise be desired.

In diecasting the unit including stator magnet 12, the die engages cap 42 and shell 41 is heavily spring loaded in the axial direction to clamp the inserted pieces firmly. Pin 16 is accurately held in a male die member which fits the inside of magnet 12 and engages the inside of cap 42. Preferably this engagement is resilient, as with a heat resistant elastomer, so that this die member can engage the lower (outer) end face of magnet 12 so that the pin will be positioned directly with respect to it.

The pins 16 and 17 serve to limit the vertical movement of the rotary element due to abnormal causes. Normally, however, the rotating element is spaced from the ends of these pins by a few thousandths of an inch so that the rotating element rotates entirely without end thrust friction.

It is preferred that the source of flash current be one which provides an exceedingly brief impulse of current. For example, it might use a half cycle of current derived from an oscillatory circuit. Good results have been obtained with an oscillating system having a frequency in the order of at least 5 kilocycles, highly dampened with resistance. Unless experiment shows to the contrary, however, it may be assumed that the flashes may be considerably longer than this would indicate. Some reduced benefits from the electroconductive metal during magnetization for shielding certain areas from magnetizing flux might result, but it is believed that there would still be a fair degree of shielding even if the impulses were, for example, a thousandth of a second.

The parts referred to as electroconductive preferably have at least the conductivity of aluminum, except the diecast metal, for which a lower conductivity must be accepted. In the magnetizer, copper or even silver is preferred. The method of magnetization disclosed herein is the subject of a divisional application, Serial No. 318,468, filed September 27, 1963.

I claim:

1. A magnetic suspension unit for supporting an element rotatable about a generally vertical axis including an inner member and an outer member, the outer surrounding the inner, said members including radially facing portions of permanent magnet material magnetized to provide two inwardly facing annular and coaxial pole faces of permanent magnet material on the outer member directly opposing two outwardly facing annular and coaxial pole faces of permanent magnet material on the inner member with the magnet portions oppositely magnetized to cause said directly opposing pole face pairs to attract one another, one of said members being the stator with its pole faces both abruptly demarked dimensionally along their lower edges, and the other of the members being a rotor with both of its pole faces being abruptly demarked dimensionally along its upper edges.

2. A magnetic suspension unit for supporting an element rotatable about a generally vertical axis including an inner member and an outer member, the outer surrounding the inner, said members including portions of permanent magnet material magnetized to provide two inwardly facing annular and coaxial pole faces of permanent magnet material on the outer member directly opposing two outwardly facing annular and coaxial pole faces of permanent magnet material on the inner member with the magnet portions oppositely magnetized to cause said directly opposing pole face pairs to attract one another, one of said members being the stator with its pole faces both abruptly demarked dimensionally along their lower edges, and the other of the members being a rotor with both its pole faces being abruptly demarked dimensionally along its upper edges, the inner of said members comprising minute particles bound together in one piece with a generally cylindrical portion removable axially from an annular mold and an annular integral projection at one end extending toward the other of said members and forming at its periphery the specified abruptly defined pole face.

3. A magnetic suspension unit for supporting an element rotatable about a generally vertical axis including an inner member and an outer member, the outer surrounding the inner, said members including radially facing portions of permanent magnet material magnetized to provide two inwardly facing annular and coaxial pole faces of permanent magnet material on the outer member directly opposing two outwardly facing annular and coaxial pole faces of permanent magnet material on the inner member with the magnet portions oppositely magnetized to cause said directly opposing pole face pairs to attract one another, one of said members being the stator with its pole faces both abruptly demarked dimensionally along their lower edges, and the other of the members being a rotor with both of its pole faces being abruptly demarked dimensionally along its upper edges, the inner of said members comprising minute particles bound together in one piece with a generally cylindrical portion removable axially from an annular mold and an annular integral projection at one end extending toward the other of said members and forming at its periphery the specified abruptly defined pole face; the outer member having a pair of highly electroconductive rings adjacent the opposite ends of the permanent magnet material thereof, and including a soft iron shell surrounding the permanent magnet material.

References Cited in the file of this patent

UNITED STATES PATENTS

| | | |
|---|---|---|
| 2,248,272 | Jurak | July 8, 1941 |
| 2,432,819 | Schumaker | Dec. 16, 1947 |
| 2,501,615 | Pugh | Mar. 21, 1950 |
| 2,585,714 | Wrobel | Feb. 12, 1952 |
| 2,653,376 | Fletcher et al. | Sept. 29, 1953 |
| 2,856,239 | Dacus | Oct. 14, 1958 |
| 2,869,934 | Milligan et al. | Jan. 20, 1959 |

FOREIGN PATENTS

| | | |
|---|---|---|
| 466,577 | Italy | Nov. 5, 1951 |
| 1,159,301 | France | June 10, 1958 |